US012794499B2

(12) United States Patent
Rey et al.

(10) Patent No.: US 12,794,499 B2
(45) Date of Patent: Nov. 10, 2026

(54) SIGNAL CORRECTION IN RECEIVER

(71) Applicant: Cypress Semiconductor Corporation, San Jose, CA (US)

(72) Inventors: Claudio Rey, Chandler, AZ (US); Igor Kolych, Lviv (UA)

(73) Assignee: Infineon Technologies Americas Corp., El Segundo, CA (US)

( * ) Notice: Subject to any disclaimer, the term of this patent is extended or adjusted under 35 U.S.C. 154(b) by 353 days.

(21) Appl. No.: 18/393,222

(22) Filed: Dec. 21, 2023

(65) Prior Publication Data

US 2025/0211270 A1 Jun. 26, 2025

(51) Int. Cl.
*H04B 1/12* (2006.01)

(52) U.S. Cl.
CPC .................................... *H04B 1/12* (2013.01)

(58) Field of Classification Search
CPC ........... H04B 1/12; H04B 1/10; H04B 1/1027
See application file for complete search history.

(56) References Cited

U.S. PATENT DOCUMENTS 6,314,142 B1 * 11/2001 Perthold ............... H03F 1/3247 330/149
6,879,817 B1 * 4/2005 Sorrells .................... H04B 1/30 455/313
7,184,495 B2 * 2/2007 Thomson ............ H04L 27/2657 375/340
7,203,255 B2 * 4/2007 Wang .................. H04L 27/2675 370/491
7,382,833 B1 * 6/2008 Peterson ............... H04L 27/364 375/296
7,831,220 B2 * 11/2010 Hammerschmidt ... H04B 17/13 455/114.1
7,929,927 B2 4/2011 Norris et al.
8,165,247 B1 * 4/2012 Madden ........... G11B 20/10268 375/345
8,279,975 B2 * 10/2012 Caruthers ........... H04L 27/3872 375/329
8,290,450 B2 * 10/2012 Hammerschmidt ... H04B 17/13 455/115.2
8,594,579 B2 * 11/2013 Muhammad ........... H04B 15/04 455/24
8,964,875 B2 * 2/2015 Muhammad ........ H04L 27/2278 375/284

(Continued)

FOREIGN PATENT DOCUMENTS

EP 3264701 A1 1/2018
EP 3706380 A1 9/2020

(Continued)

*Primary Examiner* — Hai V Nguyen

(57) ABSTRACT

One or more devices, systems, and/or methods are provided. In an example, a method includes mixing a passband receive signal with a local oscillator frequency to generate a receive signal, filtering the receive signal using a complex filter to generate a filtered receive signal, converting the filtered receive signal to a digital receive signal, and generating a corrected receive signal based on the digital receive signal by applying a first correction and a second correction to the digital receive signal, where the first correction reduces imbalance in the digital receive signal and the second correction reduces nonlinear direct current terms in the digital receive signal.

20 Claims, 8 Drawing Sheets

(56) References Cited

U.S. PATENT DOCUMENTS 9,148,328 B2 * 9/2015 Zhang .................... H04B 1/123
9,236,960 B1 * 1/2016 Tinella .................... H04B 1/123
9,577,685 B1 * 2/2017 Mirzaei ................ H04B 1/0475
9,794,056 B1 10/2017 Tamma et al.
10,003,415 B1 * 6/2018 Jiang ...................... H04B 17/11
10,068,121 B2 * 9/2018 Kremin .............. G06V 40/1306
10,116,485 B1 * 10/2018 Liu ...................... H04B 17/354
10,530,905 B1 1/2020 Rey et al.
10,594,329 B1 * 3/2020 Elkholy ................ H03L 7/1976
10,819,544 B2 10/2020 Stanciu et al.
10,862,505 B1 12/2020 Rey
10,862,728 B1 12/2020 Rey et al.
10,862,729 B1 12/2020 Rey et al.
11,121,736 B2 * 9/2021 DiTommaso .......... H04B 1/006
11,533,067 B1 * 12/2022 Guan ................... H04B 1/0014
11,545,982 B2 1/2023 Perin et al.
11,621,898 B2 4/2023 Stanciu et al.
11,688,410 B2 * 6/2023 Hoshyar ............. H04L 27/3872 381/94.3
11,757,475 B2 * 9/2023 Balakrishnan ......... H04B 1/001 375/262
12,401,450 B2 * 8/2025 Dorrance .............. H04L 1/0076
2003/0058951 A1 * 3/2003 Thomson ............ H04L 27/2675 375/371
2003/0112825 A1 * 6/2003 Wang .................. H04L 27/2675 370/493
2007/0025433 A1 * 2/2007 Hammerschmidt ... H04B 17/13 375/224
2008/0139139 A1 * 6/2008 Pan ........................ H04B 1/525 455/114.2
2011/0051791 A1 * 3/2011 Hammerschmidt ... H04B 17/13 375/226
2011/0069744 A1 * 3/2011 Laudel ................ H04L 27/0014 375/224
2011/0143701 A1 * 6/2011 Caruthers ........... H04L 27/3872 455/311
2012/0106686 A1 * 5/2012 Zhang .................... H04B 1/123 375/349
2013/0058388 A1 * 3/2013 Muhammad ........... H04B 15/04 375/222
2014/0362955 A1 * 12/2014 Muhammad ........ H04L 27/2278 375/343
2018/0013605 A1 * 1/2018 Shafiee ................... H04L 27/22
2018/0175945 A1 * 6/2018 Jiang ...................... H03K 3/017
2018/0219620 A1 * 8/2018 Fludger .................. H04B 10/40
2022/0029644 A1 * 1/2022 Balakrishnan ......... H04B 1/001
2022/0029774 A1 * 1/2022 Yuan ......................... H04B 1/44
2022/0200838 A1 * 6/2022 Azadet ................... H03D 3/009
2022/0394424 A1 * 12/2022 Li ......................... H04W 4/023
2023/0072440 A1 * 3/2023 Wang ..................... H04B 1/525
2023/0336197 A1 * 10/2023 Khalaf ................ H04L 27/3863
2024/0021522 A1 * 1/2024 Acikalin .............. H01Q 1/2283
2024/0113807 A1 * 4/2024 Dorrance .............. H04L 1/0009
2026/0039369 A1 * 2/2026 Hancharik ............... H04B 1/00
2026/0100810 A1 * 4/2026 Ramabadran .......... H04B 1/525

FOREIGN PATENT DOCUMENTS

EP 3731478 A3 10/2020
EP 3737055 A1 11/2020
EP 4064568 A1 9/2022

* cited by examiner

SIGNAL CORRECTION IN RECEIVER

TECHNICAL FIELD

The present disclosure relates to the field of communications, and more particularly to signal correction in a receiver.

BACKGROUND

A low-intermediate frequency (Low-IF) receiver mixes a radio frequency (RF) signal with a local oscillator (LO) signal to generate a downconverted intermediate frequency (IF) signal for demodulation. A low-IF receiver has non-ideal characteristics that can cause reduced sensitivity.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In an embodiment of the techniques presented herein, a receiver comprises a mixer configured to receive a passband receive signal and generate a receive signal based on a local oscillator frequency, a complex filter configured to filter the receive signal to generate a filtered receive signal, an analog-to-digital converter configured to convert the filtered receive signal to a digital receive signal, and a correction unit configured receive the digital receive signal and generate a corrected receive signal, wherein the correction unit is configured to apply a first correction and a second correction to the digital receive signal to generate the corrected receive signal, wherein the first correction reduces imbalance in the digital receive signal and the second correction reduces nonlinear direct current terms in the digital receive signal.

In an embodiment of the techniques presented herein, a receiver comprises a mixer configured to receive a passband receive signal and generate a baseband receive signal based on a local oscillator frequency, a complex filter configured to filter the baseband receive signal to generate a filtered baseband signal, an analog-to-digital converter configured to convert the filtered baseband signal to a digital receive signal, a correction unit configured receive the digital receive signal and generate a corrected receive signal, wherein the correction unit comprises a first register configured to store a first correction factor used to generate a first correction for reducing nonlinear direct current terms in the digital receive signal, a delay unit and an adaption filter configured based on a characterization of the complex filter and configured to generate a filtered adaption signal, a second register configured to store a second correction factor, and a multiplier connected to the second register and configured to apply a second correction factor to the filtered adaption signal to generate a second correction for reducing imbalance in the digital receive signal, and an adder configured to add the first correction and the second correction to the digital receive signal to generate the corrected receive signal, and a training unit configured to perform a training process to generate at least one of the first correction factor or the second correction factor.

In an embodiment of the techniques presented herein, a system comprises means for mixing a passband receive signal with a local oscillator frequency to generate a receive signal, means for filtering the receive signal using a complex filter to generate a filtered receive signal, means for converting the filtered receive signal to a digital receive signal, and means for generating a corrected receive signal based on the digital receive signal by applying a first correction and a second correction to the digital receive signal to generate the corrected receive signal, wherein the first correction reduces imbalance in the digital receive signal and the second correction reduces nonlinear direct current terms in the digital receive signal.

In an embodiment of the techniques presented herein, a method comprises mixing a passband receive signal with a local oscillator frequency to generate a receive signal, filtering the receive signal using a complex filter to generate a filtered receive signal, converting the filtered receive signal to a digital receive signal, and generating a corrected receive signal based on the digital receive signal by applying a first correction and a second correction to the digital receive signal to generate the corrected receive signal, wherein the first correction reduces imbalance in the digital receive signal and the second correction reduces nonlinear direct current terms in the digital receive signal.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
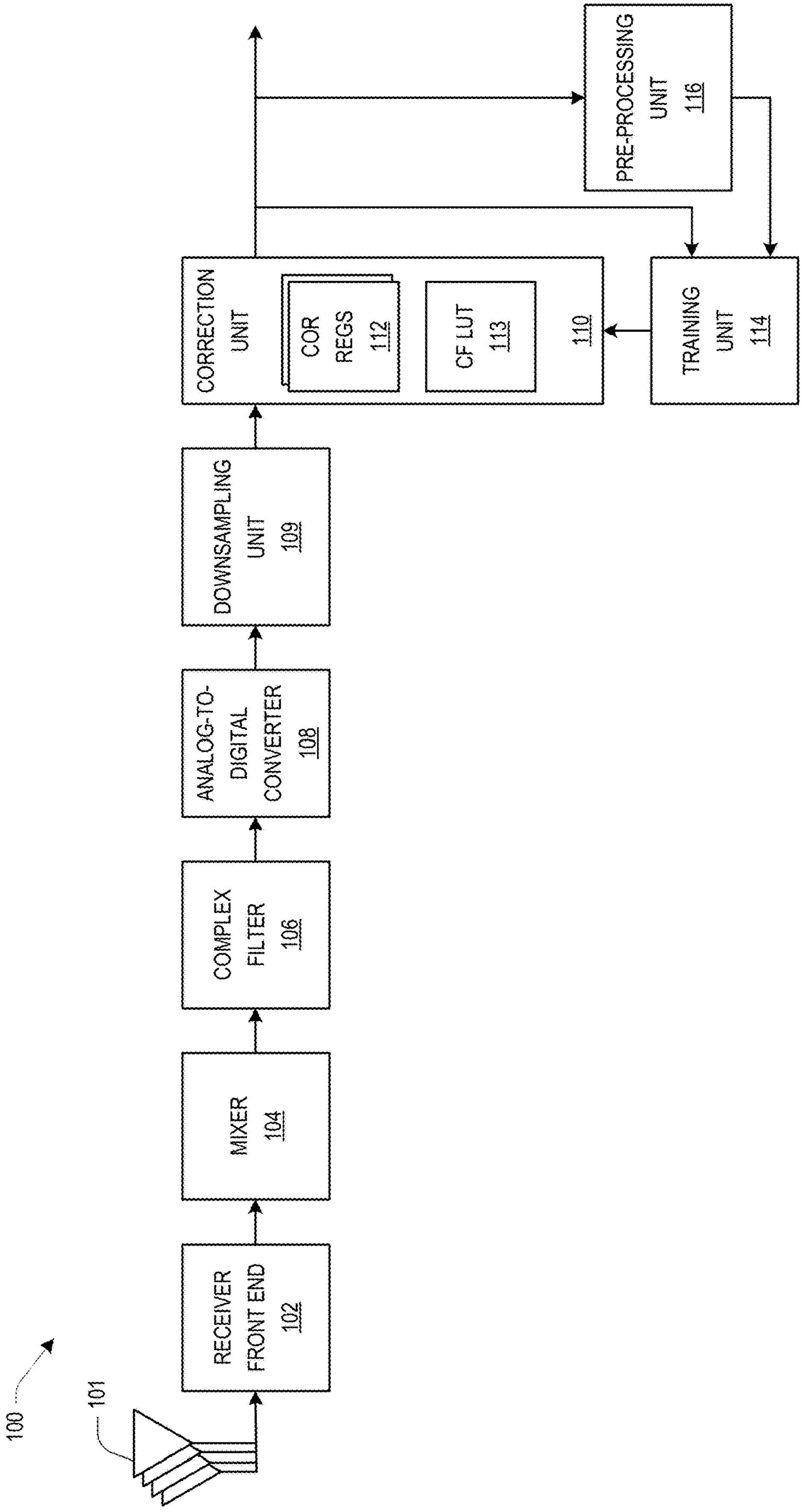
FIG. 1 is a diagram of a receiver, in accordance with some embodiments.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

It is to be understood that the following description of embodiments is not to be taken in a limiting sense. The scope of the present disclosure is not intended to be limited by the embodiments described hereinafter or by the drawings, which are taken to be illustrative only. The drawings are to be regarded as being schematic representations and elements illustrated in the drawings are not necessarily shown to scale. Rather, the various elements are represented such that their function and general purpose become apparent to a person skilled in the art.

All numerical values within the detailed description and the claims herein are modified by "about" or "approximately" the indicated value, and take into account experimental error and variations that would be expected by a person having ordinary skill in the art.

In a Low-IF receiver non-ideal characteristics, such as in-phase/quadrature (IQ) imbalance and nonlinear direct current (DC) terms, such as LO feedthrough (LOFT), analog-to-digital converter (ADC) DC offset, quadratic nonlinearity in the receive path RF front end, can cause reduced sensitivity. For example, the receiver may be exposed to an external signal, referred to as a blocker, which can cause interference. A blocker signal downconverted to baseband can at least partially overlap the desired frequency of the receiver, thereby reducing receiver sensitivity. Moreover, non-idealities of the receiver may produce an image of the blocker signal at the received signal frequency. A complex filter, such as a bandpass or low pass filter, may be provided to mitigate blocker signals. LOFT occurs when the LO signal is not properly mixed with the incoming signal and results in an additional component in the DC term. In some embodiments, a joint technique is used to correct for IQ imbalance and non-linear DC terms in the receiver. A correction unit includes an adaptation filter trained to correct for IQ imbalance. In some embodiments, the adaptation filter is pre-trained to generate correction coefficients for IQ imbalance correction. The coefficients of the correction unit are determined using a dynamic receiver training sequence. Using the adaptation filter included in the correction unit, the training of the correction unit accounts for both IQ imbalance and LOFT concurrently.

FIG. 1 is a diagram of receiver 100, in accordance with some embodiments. The receiver 100 includes an antenna array 101, a receiver front end 102, a mixer 104, a complex filter 106, an analog-to-digital converter (ADC) 108, a downsampling unit 109, a correction unit 110 that includes correction registers 112 for correcting the baseband receive signal and an optional correction factor lookup table (LUT) 113 for storing parameters correction factors for different configurations of the receiver 100, a training unit 114 for training the correction unit 110, a pre-processing unit 116 for providing an input to the training unit 114. Other structures and/or configurations of the receiver 100 are within the scope of the present disclosure.

In some embodiments, the antenna array 101 includes multiple antennas configured as a multiple input multiple output (MIMO) system. The receiver front end 102 performs amplification and signal processing functions on the received time domain signal. In some embodiments, the mixer 104 converts a passband receive signal to a baseband receive signal using a mixer/downconversion operation with a local oscillator signal. Imperfections in the mixer 104 may result in IQ imbalance and nonlinear DC terms in the baseband receive signal. The complex filter 106 may be configured to filter the baseband receive signal to generate a filtered receive signal. The complex filter 106 reduces noise and passes the frequency bands used by the receiver 100. For example, the complex filter 106 may be configured to reduce the effects of a blocker signal having a frequency near the baseband of the receiver 100. The complex filter 106 may be a band pass filter or a low pass filter. The ADC 108 generates a digital receive signal from the baseband receive signal. The downsampling unit 109 may reduce the sample rate (e.g., from 200 MHz to 25 MHz) and filter blocker components, thereby reducing the cost associated with processing the high frequency data generated by the ADC 108. In some embodiments, the correction unit 110 reduces the effects of IQ imbalance and nonlinear DC terms in the digital receive signal based on correction factors stored in the correction registers 112. The training unit 114 determines the values for the correction registers using a dynamic training process. In some embodiments, the training process is performed during a startup of the receiver 100. The training process may be repeated at fixed time intervals, after certain events, or based on parameters of the receiver 100, such as temperature, sensitivity, signal-to noise ratio, or the like.

Figure 2:
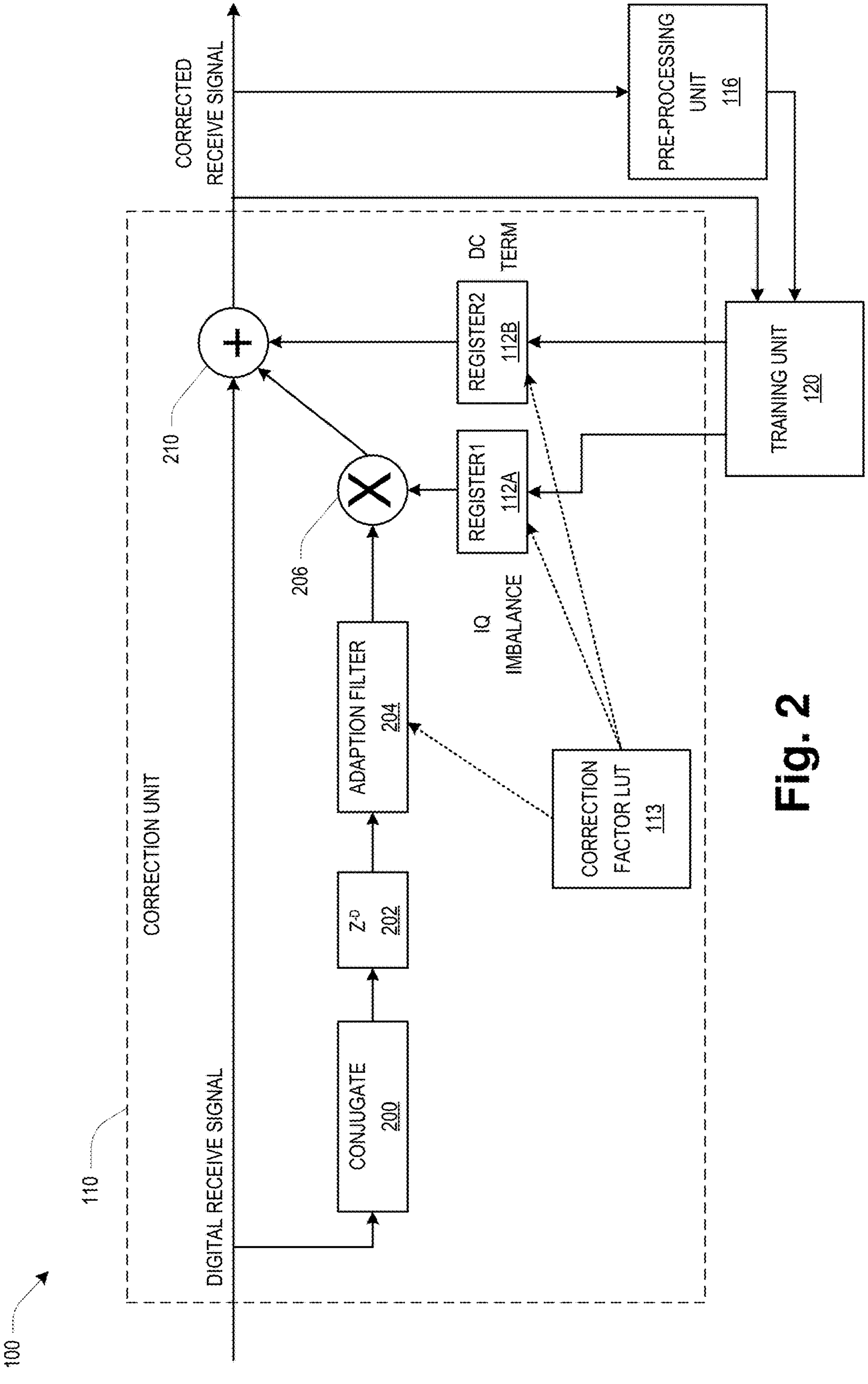
FIG. 2 is a diagram of a correction unit, in accordance with some embodiments.

FIG. 2 is a diagram of the correction unit 110, in accordance with some embodiments. In some embodiments, the correction unit 110 comprises a conjugate unit 200 configured to apply a complex conjugate operation to the digital receive signal to generate a conjugate signal, a delay unit 202 configured to delay the conjugate signal to generate a delayed signal, and an adaption filter 204 configured to filter the delayed signal to generate an adaption signal. In some embodiments, coefficients of the delay unit 202 and the adaption filter 204 are pre-trained based on a mathematical model for correcting estimated nonlinear DC terms based on a characterization of the complex filter 106.

The output of the correction unit 110 is a corrected receive signal. In some embodiments, the correction registers 112 include a correction register 112A that stores a first correction factor applied to the output of the adaption filter 204 by a multiplier 206 to generate a first correction, and a register correction 112B that stores a second correction factor applied to the corrected receive signal to generate a second correction. The correction registers 112A, 112B are also accessed by the training unit 114 in some embodiments. An adder 210 concurrently adds the first correction and the second correction to the digital receive signal to generate the corrected receive signal. In some embodiments, the training unit 120 performs a joint calibration of the correction unit 110 to concurrently determine values for the correction registers 112A, 112B. The corrections provided by the adaption filter 204 and the correction registers 112A, 112B reduce the effects of actual IQ imbalance and nonlinear DC terms in the corrected receive signal. The training unit 120 trains the correction unit 110 to concurrently address IQ imbalance and nonlinear DC terms.

Figure 3:
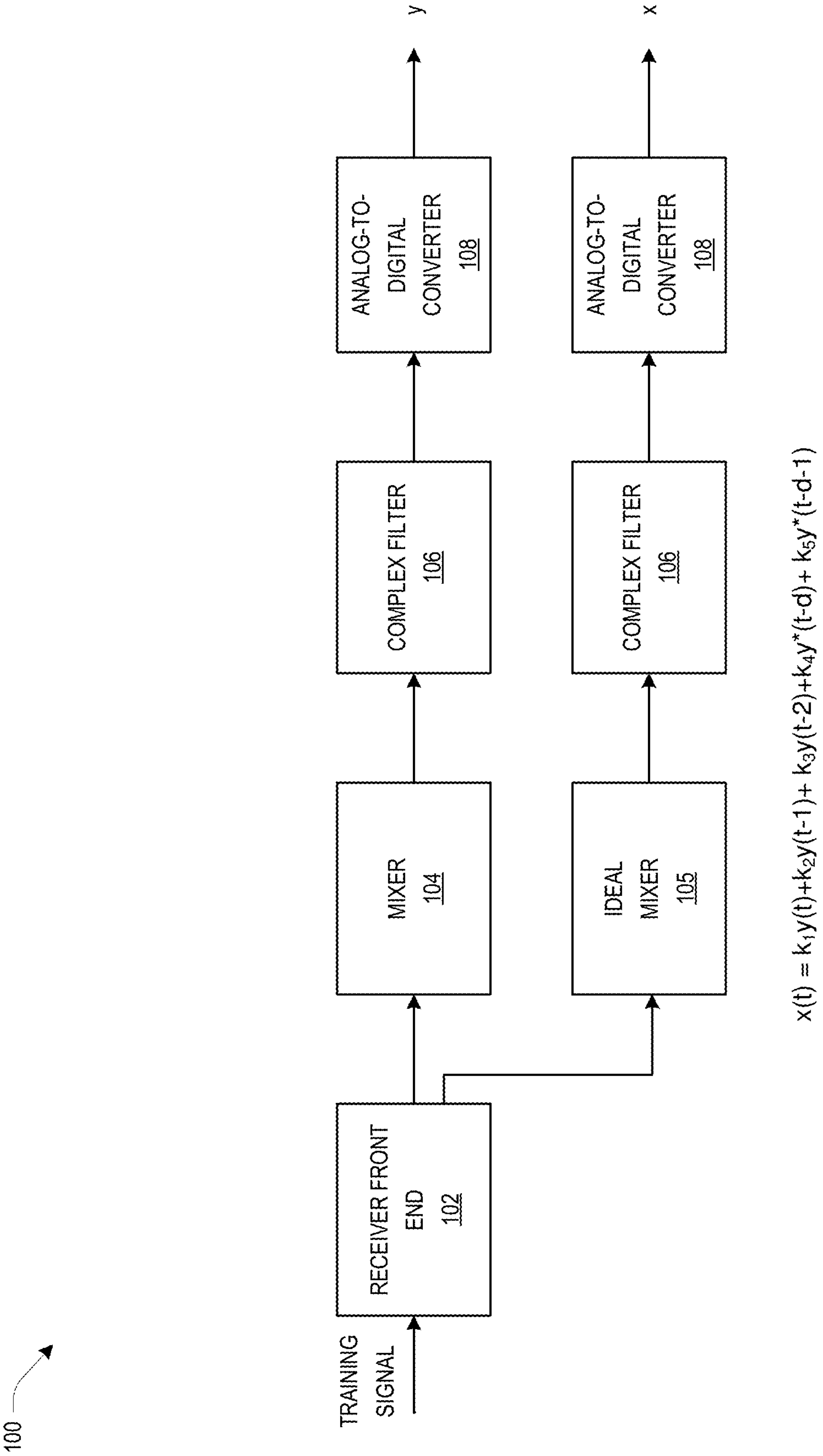
FIG. 3 is a diagram illustrating training of an adaption filter, in accordance with some embodiments.

FIG. 3 is a diagram illustrating training of the adaption filter 204, in accordance with some embodiments. The coefficients of the delay unit 202 and the adaption filter 204 may be pre-trained using the known characteristics of the complex filter 106. In some embodiments, the receiver front end 102, the mixer 104, the complex filter 106, and the ADC 108 are simulated mathematically to generate a "y" term. An "x" term does not include the imperfections of the mixer 104, but instead includes an ideal mixer 105. Simulated or characterized data is used to generate a mathematical model having the form:

$$x(t) = k_1 y(t) + k_2 y(t-1) + k_3 y(t-2) + k_4 y*(t-d) + k_5 y*(t-d-1).$$

The coefficients for $k_1$, $k_2$, $k_3$, $k_4$, $k_5$, and the delay term, d, are generated using the mathematical training process. In some embodiments, the adaption filter 204 is a multiple-tap finite impulse response (FIR) filter. The adaption filter 204 may be a two-tap filter having taps:

$$[1, k_5/k_4].$$

Figure 4:
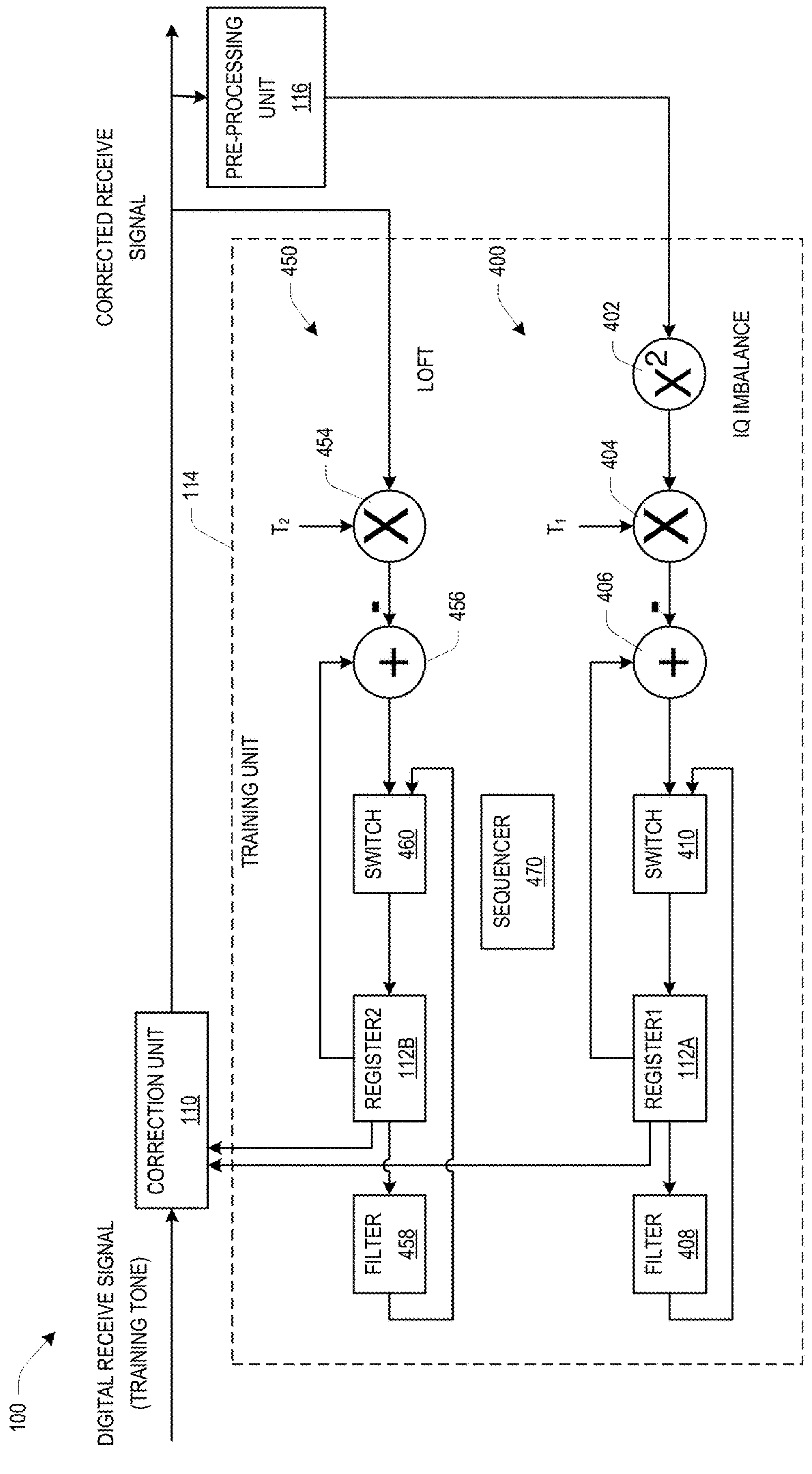
FIG. 4 is a diagram of a training unit, in accordance with some embodiments.

FIG. 4 is a diagram of the training unit 114, in accordance with some embodiments. In some embodiments, the training unit 114 may use a tone as a training signal to configure the correction registers 112 to reduce the actual IQ imbalance and LOFT in the digital receive signal. In some embodiments, the pre-processing unit normalizes the corrected receive signal to generate a normalized corrected receive signal within a certain amplitude band, such as between 0.5 and 1.0. Normalizing the corrected receive signal reduces the likelihood of dynamic range issues arising in the training unit 114.

In some embodiments, the training unit 114 comprises an imbalance path 400 for reducing IQ imbalance in the digital receive signal and a nonlinear DC term path 450 for reducing nonlinear DC terms in the digital receive signal. The imbalance path 400 comprises a square unit 402 that squares the normalized corrected receive signal from the pre-processing unit 116 to generate a squared signal, a first multiplier 404 that multiples the squared signal by a first learning rate, $T_1$, to generate a first training factor, and a first adder 406 that subtracts the first training factor from the first correction factor stored in the correction register 112A to generate an updated first correction factor for storing in the correction register 112A. A first filter 408 filters previous values of the first correction factor in the correction register 112A to generate a filtered first correction factor. In some embodiments, the first filter 408 uses a simple average or a weighted average, such as an exponentially weighted moving average (EWMA), technique for generating the filtered first correction factor. A first switch 410 selects between the updated first correction factor and the filtered first correction factor for updating the correction register 112A.

The nonlinear DC term path 450 comprises a second multiplier 454 that multiples normalized corrected receive signal from the pre-processing unit 116 by a second learning rate, $T_2$, to generate a second training factor, and a second adder 456 that subtracts the second training factor from the second correction factor stored in the correction register 112B to generate an updated second correction factor for storing in the correction register 112B. A second filter 458 filters previous values of the second correction factor in the correction register 112B to generate a filtered second correction factor. In some embodiments, the second filter 458 uses a simple average or a weighted average, such as an exponentially weighted moving average (EWMA), technique for generating the filtered second correction factor. A second switch 460 selects between the updated second correction factor and the filtered second correction factor for updating the correction register 112B.

In some embodiments, the training unit 114 comprises a sequencer 470 that controls the switches 410, 460 and configures the learning rates, $T_1$ and $T_2$, during the training process. In a training sequence, the sequencer sets the values of the learning rates, $T_1$ and $T_2$, and configures the switches 410, 460 to select the correction registers 112A, 112B, respectively. The training unit 114 updates the first correction factor in the correction register 112A and the second correction factor in the correction register 112B until a convergence condition is reached. In a subsequent training sequence, the sequencer 470 stores the filtered correction factors in the correction registers 112A, 112B by changing the selections for the switches 410, 460 and changes the values of the learning rates, $T_1$ and $T_2$, for example to a smaller value for finer tuning. The sequencer 470 then reconfigures the switches 410, 460 to select the correction registers 112A, 112B, respectively, and repeats the training until convergence is reached. The iterations may continue with increasingly smaller values for the learning rates, $T_1$ and $T_2$. In general, a larger magnitude for the learning rates, $T_1$ and $T_2$, results in faster convergence. In some embodiments, the sequencer 470 uses the same values for the learning rates, $T_1$ and $T_2$ for each training sequence. After the training sequences are complete, the sequencer 470 stores the final filtered correction factors in the correction registers 112A, 112B by changing the selections for the switches 410, 460.

After training, the training unit 114 and the pre-processing unit 116 are shut down to conserve power. The correction unit 110 uses the values in the correction registers 112A, 112B to compensate for imbalance and nonlinear DC terms in the digital receive signal during normal operation of the receiver 100. In some embodiments, the training process may be repeated at a predetermined frequency, after startup cycle of the receiver 100, after a predetermined event, such as a temperature of the receiver 100 exceeding a threshold, or in response to some other condition.

Concurrent training of the imbalance correction factor in the correction register 112A and the nonlinear DC term correction factor in the correction register 112B improves the performance of the receiver 100. For example, the amount correction achieved by the receiver 100 may be increased, making the receiver 100 less susceptible to interference from a blocker.

In some embodiments, the receiver 100 is configurable for example, the receiver 100 is configurable to change the bandwidth (BW) of the complex filter 106. The correction factor LUT 113 may store different sets of correction factors for different receiver configurations (e.g., different BWs). The correction factor LUT 113 may be implemented as separate tables for each of the registers 112A, 112B and the adaptation filter 204 or separate regions of the correction factor LUT 113 may be provided for each of the registers 112A, 112B and the adaptation filter 204. Sets of configuration factors for different receiver configurations may be determined by training individually for each configuration of the receiver 100. In some embodiments, a first set of configuration factors may be determined by training for a first receiver configuration, and offset parameters may be stored in the correction factor LUT 113 for other configurations to mathematically adjust the first set of configuration factors to generate a second set of configuration factors for a second receiver configuration. In some embodiments, the input parameter for the correction factor LUT 113 is bandwidth and the output parameter depends on the destination, such as the register 112A, the register 112B, or the adaption filter 204.

In some embodiments, offset parameters may be generated offline by performing training processes for receivers 100 configured with BW1 and BW2 Ratios of the correction factors for the different configurations may be determined to generate the offset parameters. The offset factors for the correction registers 112A, 112B may be multipliers. The offset factors for the adaption filter 204 may be complex numbers:

$$\rho_{BW} = \rho_0 * \alpha(BW) \text{ and } \varphi_{BW} = \varphi_0 + \beta(BW),$$

$$x_{BW} + iy_{BW} = \rho_{BW} e^{i\varphi_{BW}} = \alpha\rho_0 e^{i(\varphi_0+\beta)} = (x_0 + iy_0) * \alpha e^{i\beta}.$$

In an example, the correction factor LUT 113 may store a and B coefficients for complex filters 106 with different bandwidths. At start-up, the correction unit 110 may retrieve the correction factors for the configuration of the receiver 100 for the complex filter 106 with BW0. Upon identifying that the complex filter 106 is configured with BW2, the correction unit 110 may use the offset parameters associated with BW2 to change the correction factors. If the modified bandwidth does not correspond to a bandwidth in the correction factor LUT 113, the correction unit 110 may interpolate the offset parameters for other bandwidths.

In some embodiments, a set of configuration factors for a single receiver configuration, e.g., 1.8 MHz analog filter BW, includes configuration factors $\rho_0$ and $\varphi_0$. The coefficients for an adaption filter 204 having an arbitrary bandwidth can be determined by:

$$\rho_{BW}/\rho_0 \text{ and}$$

$$\varphi_{BW}-\varphi_0.$$

In some embodiments, the correction factor LUT 113 may facilitate performing the functions of the training unit 120 offline to reduce processing requirements of the receiver 100. Alternatively, after loading the initial set of correction factors, the training unit 114 may be invoked to retrain the receiver 100 to adjust the correction parameters loaded from the correction factor LUT 113 or modified using offset parameters.

Figure 5:
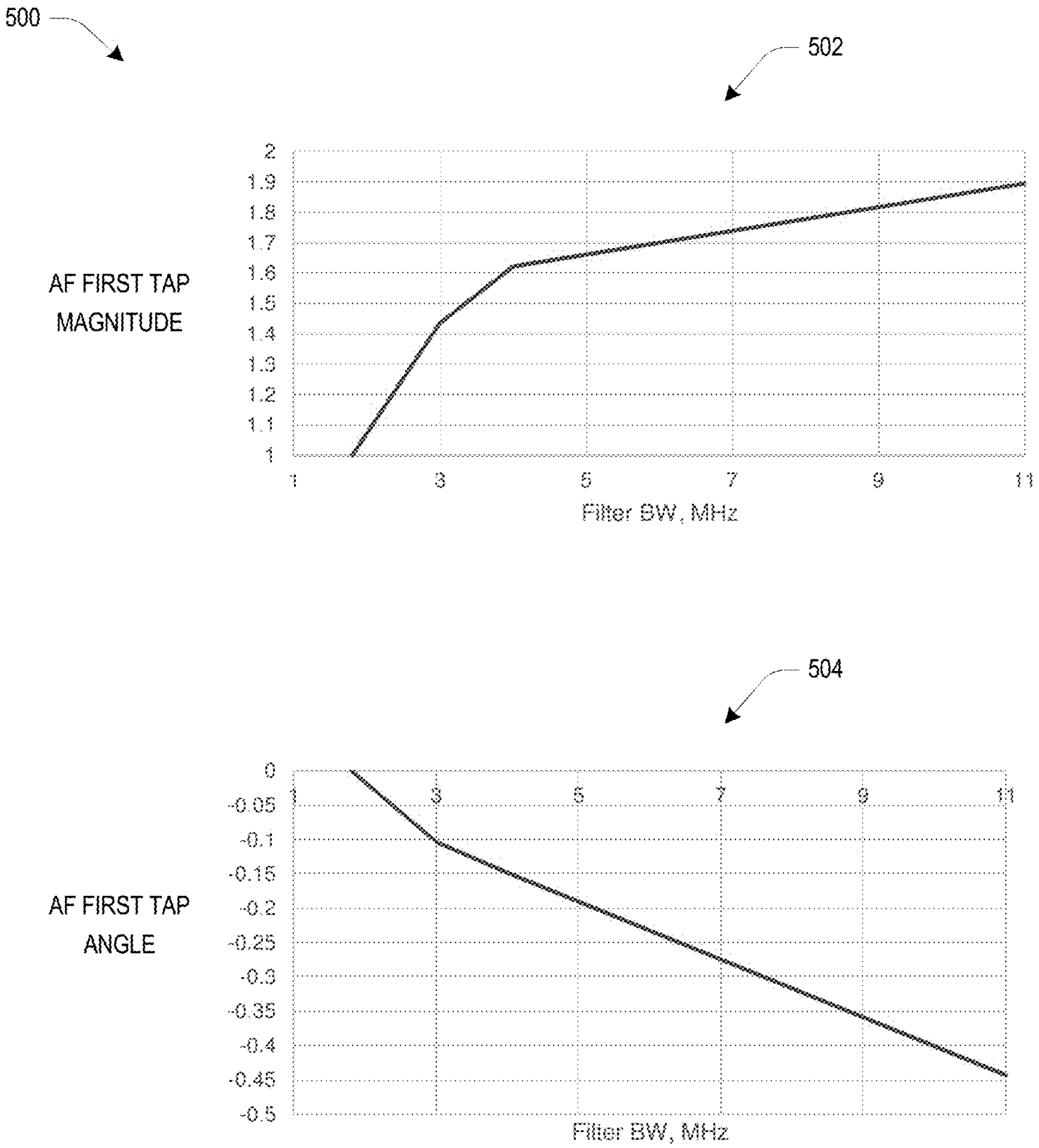
FIG. 5 is a flow chart illustrating an example method for correcting imbalance and nonlinear direct current terms in a receiver, in accordance with some embodiments.
Figure 6:
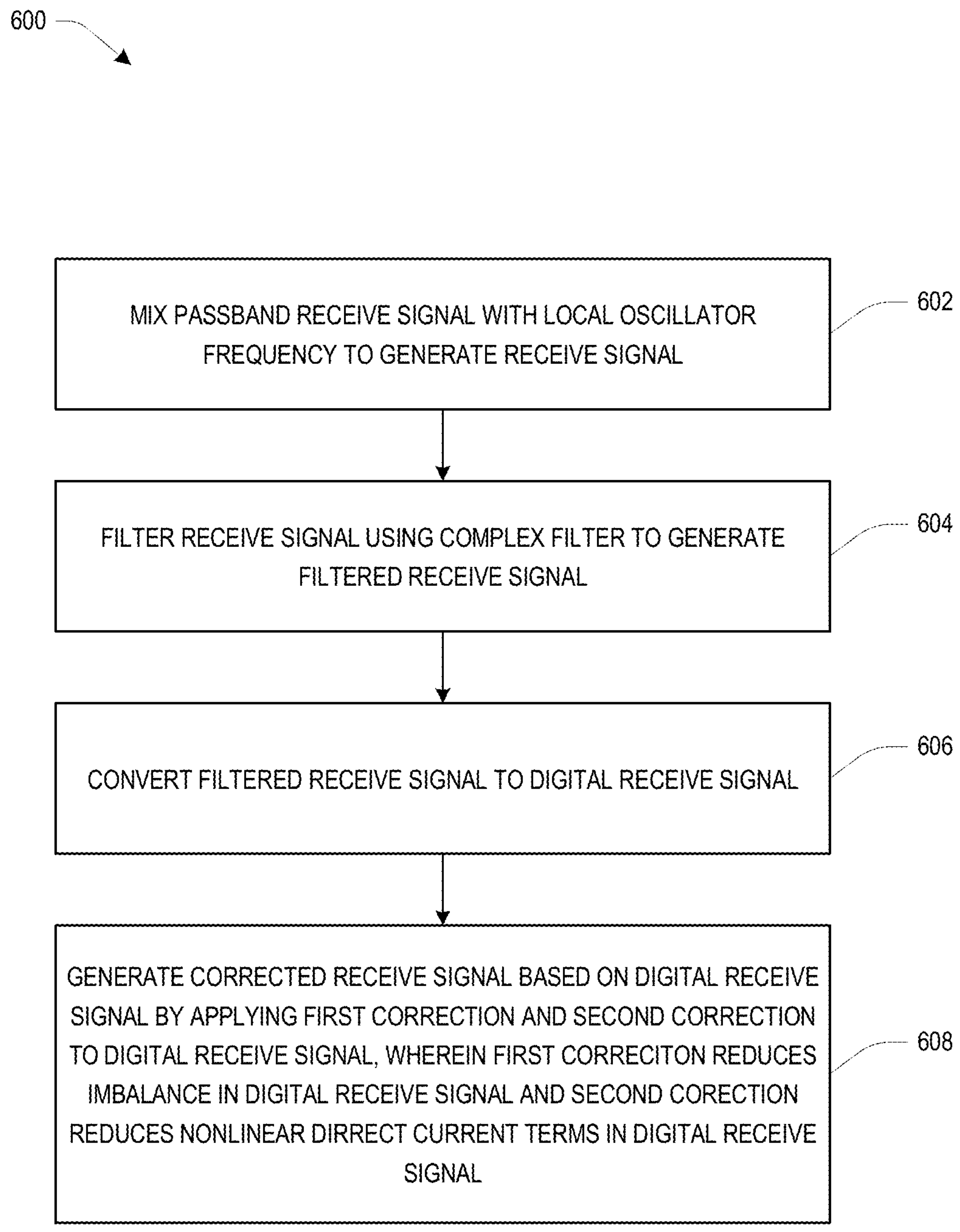
FIG. 6 is a simplified block diagram of a radio, in accordance with some embodiments.

FIG. 5 is a diagram 500 illustrating offset parameters for the adaption filter 204, in accordance with some embodiments. Curve 502 illustrates the magnitude of the first tap of the adaption filter 204 as a function of filter bandwidth. Curve 504 illustrates the angle of the first tap of the adaption filter 204 as a function of filter bandwidth. FIG. 6 is a flow chart illustrating an example method 600 for correcting imbalance and nonlinear DC terms in a receiver 100, in accordance with some embodiments. At 602, a passband receive signal is mixed with a local oscillator frequency to generate a receive signal. At 604, the receive signal is filtered using a complex filter to generate a filtered receive signal. At 606, the filtered receive signal is converted to a digital receive signal. At 608, a corrected receive signal is generated based on the digital receive signal by applying a first correction and a second correction to the digital receive signal, wherein the first correction reduces imbalance in the digital receive signal and the second correction reduces nonlinear DC terms in the digital receive signal.

Figure 7:
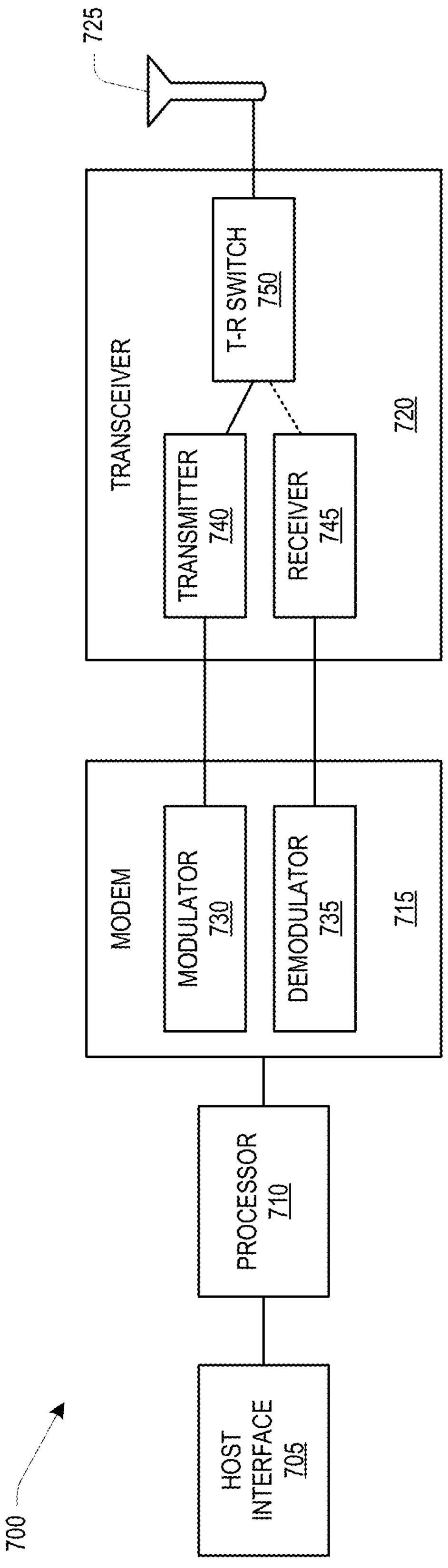
FIG. 7 is a simplified block diagram of a radio, according to some embodiments.

FIG. 7 is a simplified block diagram of a radio 700, according to some embodiments. The radio 700 may support one or more communication protocols, such as a Bluetooth (BT), Bluetooth Low Energy (BLE), Wi-Fi, or some other communication protocol. In some embodiments, the radio comprises a host interface 705, a processor 710, a modem 715, a transceiver 720, and an antenna 725. The radio 700 may communicate with other devices, such as a host computer, using the host interface 705. The modem 715 comprises a modulator 730 and a demodulator 735. The transceiver 720 comprises includes a transmitter 740, a receiver 745, and a transmit-receive (T-R) switch 750 . . . is the receiver 745 may be implemented using the receiver 100 of FIG. 1. The T-R switch 750 is connected to the antenna 725 at an antenna port 755. The transmitter 740 is configured to transmit signals provided by the modulator 730 and the receiver 745 receives modulated signals and provide the modulated signals to demodulator 735 in the modem 715 for processing. Additionally, the radio 700 may further include a number of band pass filters, amplifiers, multiplexers, demultiplexers, converters, error correction units, analog-to-digital converters (ADCs), digital-to-analog converters (DACs), or other circuits within and through which signals are passed between the antenna 725 and components of the communication system.

The processor 710 implements a software or firmware application that controls communication by the radio 700. The processor 710 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. The processor 710 may be implemented as hardware (e.g., a microprocessor, etc.) or a combination of hardware and software (e.g., a SoC, an ASIC, etc.) and may include one or multiple memories (e.g., cache, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other suitable type of memory).

In an embodiment, components of the host interface 705, the processor 710, the modem 715, and the transceiver 720 are integrally formed or incorporated on a single integrated circuit (IC) chip. The antenna 725 can also be integrally formed on the same IC chip, or on a separate chip or substrate packaged in a single multi-chip IC package with the IC chip including the host interface 705, the processor 710, the modem 715, and the transceiver 720. Alternatively, the antenna 725, as well as other components of the radio 700 can be separately implemented on a printed circuit board (PCB) to which the IC chip including the host interface 705, the processor 710, the modem 715, and the transceiver 720 are mounted or attached.

The processor 710 controls the T-R switch 750 to toggle between transmit and receive modes such that the transmitter 740 is connected to the antenna 725 during a transmit mode and the receiver 745 is connected to the antenna 725 during a receive mode. The radio 700 may include fewer components, additional components, different components, and/or a different arrangement of components than those illustrated in FIG. 7.

Figure 8:
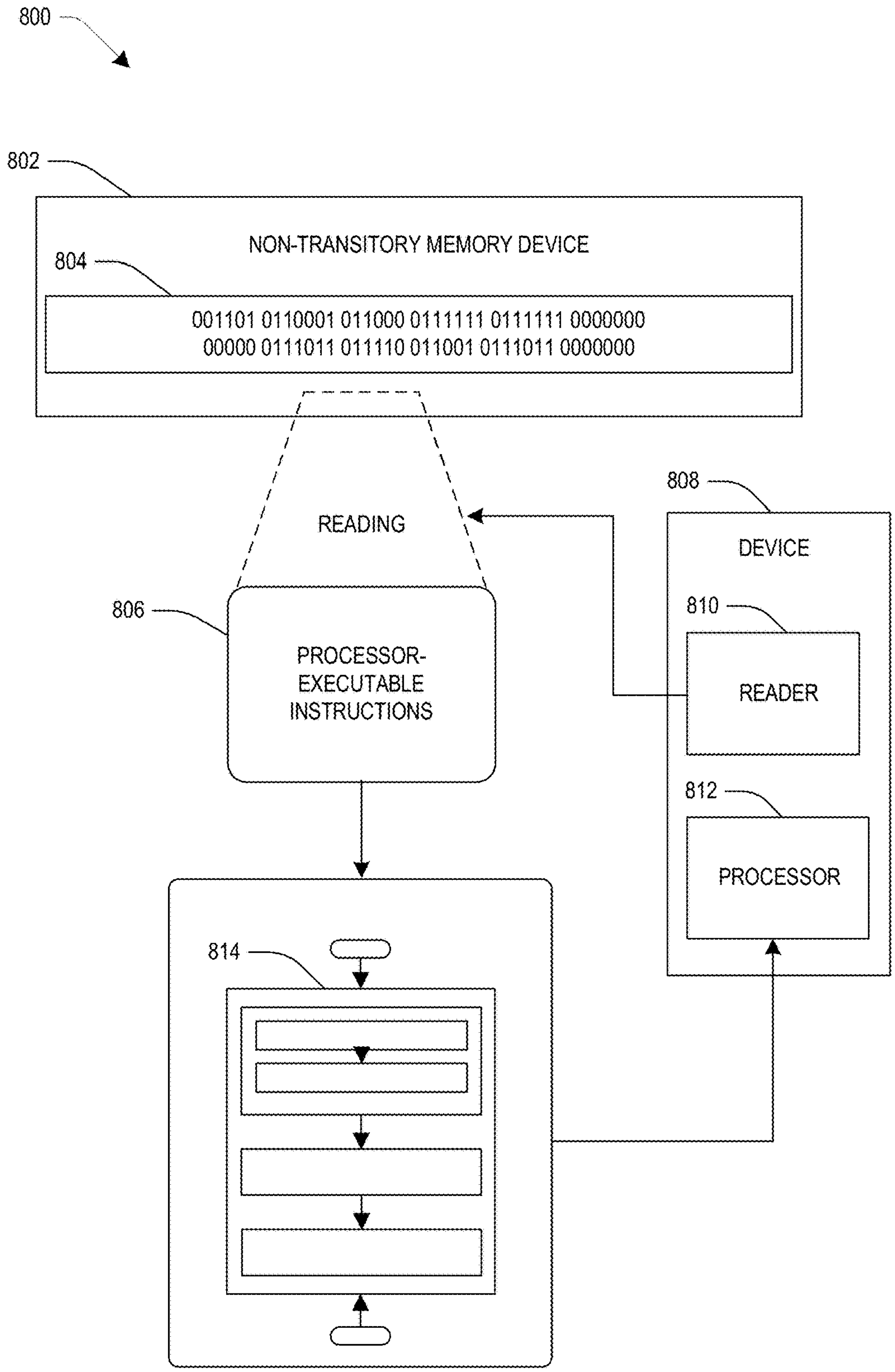
FIG. 8 illustrates an exemplary embodiment of a computer-readable medium, in accordance with some embodiments.

FIG. 8 illustrates an exemplary embodiment 800 of a computer-readable medium 802, in accordance with some embodiments. One or more embodiments involve a computer-readable medium comprising processor-executable instructions configured to implement one or more of the techniques presented herein. The embodiment 800 comprises a non-transitory computer-readable medium 802 (e.g., a CD-R, DVD-R, flash drive, a platter of a hard disk drive, etc.), on which is encoded computer-readable data 804. This computer-readable data 804 in turn comprises a set of processor-executable computer instructions 806 that, when executed by a computing device 808 including a reader 810 for reading the processor-executable computer instructions 806 and a processor 812 for executing the processor-executable computer instructions 806, are configured to facilitate operations according to one or more of the principles set forth herein. In some embodiments, the processor-executable computer instructions 806, when executed, are configured to facilitate performance of a method 814, such as at least some of the aforementioned method(s). In some embodiments, the processor-executable computer instructions 806, when executed, are configured to facilitate implementation of a system, such as at least some of the aforementioned system(s). Many such computer-readable media may be devised by those of ordinary skill in the art that are configured to operate in accordance with the techniques presented herein.

The term "computer readable media" may include communication media. Communication media typically embodies computer readable instructions or other data in a "modulated data signal" such as a carrier wafer or other transport mechanism and includes any information delivery media. The term "modulated data signal" may include a signal that has one or more of its characteristics set or changed in such a manner as to encode information in the signal.

In an embodiment of the techniques presented herein, a receiver comprises a mixer configured to receive a passband receive signal and generate a receive signal based on a local oscillator frequency, a complex filter configured to filter the receive signal to generate a filtered receive signal, an analog-to-digital converter configured to convert the filtered receive signal to a digital receive signal, and a correction unit configured receive the digital receive signal and generate a corrected receive signal, wherein the correction unit is configured to apply a first correction and a second correction to the digital receive signal to generate the corrected receive signal, wherein the first correction reduces imbalance in the digital receive signal and the second correction reduces nonlinear direct current terms in the digital receive signal.

In an embodiment of the techniques presented herein, the correction unit comprises a first register configured to store a first correction factor used to generate the first correction, and a second register configured to store a second correction factor used to generate the second correction.

In an embodiment of the techniques presented herein, the correction unit comprises a conjugate unit configured to receive the digital receive signal and generate a conjugate signal, a delay unit configured to delay the conjugate signal to generate a delayed signal, an adaption filter configured to filter the delayed signal to generate a filtered adaption signal, a register configured to store a correction factor, and a multiplier connected to the register to apply the correction factor to the filtered adaption signal to generate the first correction.

In an embodiment of the techniques presented herein, at least one of the adaption filter comprises a multiple-tap finite impulse response filter, or coefficients of at least one of the adaption filter or the delay unit are configured based on a characterization of the complex filter.

In an embodiment of the techniques presented herein, the receiver comprises a training unit configured to perform a training process to generate at least one of a first correction factor for the first correction or a second correction factor for the second correction.

In an embodiment of the techniques presented herein, the receiver comprises a pre-processing unit configured to generate a normalized corrected receive signal and provide the normalized corrected receive signal to the training unit for use in generating the first correction factor.

In an embodiment of the techniques presented herein, the training unit comprises an imbalance path for generating the first correction factor, and a nonlinear direct current term path for generating the second correction factor.

In an embodiment of the techniques presented herein, the imbalance path comprises a first register configured to store the first correction factor, a square unit configured to generate a squared signal, a first multiplier configured to multiply the squared signal by a first learning rate to generate a first training factor, and a first adder configured to subtract the first training factor from the first correction factor to generate an updated first correction factor for use in generating a second corrected receive signal from a second digital receive signal after the corrected receive signal is generated, and the nonlinear direct current term path comprises a second register configured to store the second correction factor, a second multiplier configured to use a second learning rate to generate a second training factor, and a second adder configured to subtract the second training factor from the second correction factor to generate an updated second correction factor for use in generating the second corrected receive signal from the second digital receive signal after the corrected receive signal is generated.

In an embodiment of the techniques presented herein, the training unit comprises a sequencer configured to generate the first learning rate and the second learning rate for a first training sequence, the imbalance path comprises a first filter configured to filter the first correction factor to generate a filtered first correction factor, and a first switch configured to store one of the filtered first correction factor or the updated first correction factor in the first register, the nonlinear direct current term path comprises a second filter configured to filter the second correction factor to generate a filtered second correction factor, and a second switch configured to store one of the filtered second correction factor or the updated second correction factor in the second register, and the sequencer is configured to change the first learning rate and the second learning rate for a second training sequence, control the first switch to load the first register with the filtered first correction factor for the second training sequence, and control the second switch to load the second register with the filtered second correction factor for the second training sequence.

In an embodiment of the techniques presented herein, a receiver comprises a mixer configured to receive a passband receive signal and generate a baseband receive signal based on a local oscillator frequency, a complex filter configured to filter the baseband receive signal to generate a filtered baseband signal, an analog-to-digital converter configured to convert the filtered baseband signal to a digital receive signal, a correction unit configured receive the digital receive signal and generate a corrected receive signal, wherein the correction unit comprises a first register configured to store a first correction factor used to generate a first correction for reducing nonlinear direct current terms in the digital receive signal, a delay unit and an adaption filter configured based on a characterization of the complex filter and configured to generate a filtered adaption signal, a second register configured to store a second correction factor, and a multiplier connected to the second register and configured to apply a second correction factor to the filtered adaption signal to generate a second correction for reducing imbalance in the digital receive signal, and an adder configured to add the first correction and the second correction to the digital receive signal to generate the corrected receive signal, and a training unit configured to perform a training process to generate at least one of the first correction factor or the second correction factor.

In an embodiment of the techniques presented herein, the correction unit comprises a conjugate unit configured to receive the digital receive signal and generate a conjugate signal, wherein the delay unit is configured to delay the conjugate signal to generate a delayed signal, and the adaption filter configured to filter the delayed signal to generate the filtered adaption signal.

In an embodiment of the techniques presented herein, the adaption filter comprises a multiple-tap finite impulse response filter.

In an embodiment of the techniques presented herein, the receiver comprises a pre-processing unit configured to generate a normalized corrected receive signal and provide the normalized corrected receive signal to the training unit for use in generating the first correction factor.

In an embodiment of the techniques presented herein, the training unit comprises an imbalance path for generating the first correction factor, and a nonlinear direct current term path for generating the second correction factor.

In an embodiment of the techniques presented herein, the imbalance path comprises a square unit configured to generate a squared signal, a first multiplier configured to multiply the squared signal by a first learning rate to generate a first training factor, and a first adder configured to subtract the first training factor from the first correction factor to generate an updated first correction factor for use in generating a second corrected receive signal from a second digital receive signal after the corrected receive signal is generated, and the nonlinear direct current term path comprises a second multiplier configured to use a second learning rate to generate a second training factor, and a second subtraction unit configured to subtract the second training factor from the second correction factor to generate an updated second correction factor for use in generating the second corrected receive signal from the second digital receive signal after the corrected receive signal is generated.

In an embodiment of the techniques presented herein, the training unit comprises a sequencer configured to generate the first learning rate and the second learning rate for a first training sequence, the imbalance path comprises a first filter configured to filter the first correction factor to generate a filtered first correction factor, and a first switch configured to store one of the filtered first correction factor or the updated first correction factor in the first register, the nonlinear direct current term path comprises a second filter configured to filter the second correction factor to generate a filtered second correction factor, and a second switch configured to store one of the filtered second correction factor or the updated second correction factor in the second register, and the sequencer is configured to change the first learning rate and the second learning rate for a second training sequence, control the first switch to load the first register with the filtered first correction factor for the second training sequence, and control the second switch to load the second register with the filtered second correction factor for the second training sequence.

In an embodiment of the techniques presented herein, a method comprises mixing a passband receive signal with a local oscillator frequency to generate a receive signal, filtering the receive signal using a complex filter to generate a filtered receive signal, converting the filtered receive signal to a digital receive signal, and generating a corrected receive signal based on the digital receive signal by applying a first correction and a second correction to the digital receive signal to generate the corrected receive signal, wherein the first correction reduces imbalance in the digital receive signal and the second correction reduces nonlinear direct current terms in the digital receive signal.

In an embodiment of the techniques presented herein, the method comprises using a first correction factor to generate the first correction, generating a conjugate signal based on the digital receive signal, delaying the conjugate signal to generate a delayed signal, filtering the delayed signal to generate a filtered adaption signal, and applying a second correction factor to the filtered adaption signal to generate the second correction.

In an embodiment of the techniques presented herein, the method comprises performing a training process to generate a first correction factor for the first correction.

In an embodiment of the techniques presented herein, the method comprises performing the training process to generate a second correction factor for the second correction.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

While the subject matter has been described with reference to illustrative embodiments, this description is not intended to be construed in a limiting sense. Various modifications and combinations of the illustrative embodiments, as well as other embodiments of the present disclosure, will be apparent to persons skilled in the art upon reference to the description. It is therefore intended that the appended claims encompass any such modifications or embodiments.

What is claimed is:

1. A receiver, comprising:

a mixer configured to receive a passband receive signal and generate a receive signal based on a local oscillator frequency;

a complex filter configured to filter the receive signal to generate a filtered receive signal;

an analog-to-digital converter configured to convert the filtered receive signal to a digital receive signal; and a correction unit configured to:

generate a conjugate signal based on the digital receive signal;

delay the conjugate signal to generate a delayed conjugate signal;

multiply the delayed conjugate signal by a first correction factor to generate a first correction;

generate a second correction based on a second correction factor; and add the first correction and the second correction to the digital receive signal to generate a corrected receive signal, wherein the first correction reduces imbalance in the digital receive signal and the second correction reduces nonlinear direct current terms in the digital receive signal.

2. The receiver of claim 1, wherein the correction unit comprises:

a first register configured to store the first correction factor used to generate the first correction; and a second register configured to store the second correction factor used to generate the second correction.

3. The receiver of claim 1, wherein the correction unit comprises:

a conjugate unit configured to receive the digital receive signal and generate the conjugate signal;

a delay unit configured to delay the conjugate signal to generate the delayed conjugate signal;

an adaption filter configured to filter the delayed conjugate signal to generate a filtered adaption signal;

a register configured to store a correction factor; and a multiplier connected to the register to apply the correction factor to the filtered adaption signal to generate the first correction factor.

4. The receiver of claim 3, wherein at least one of:

the adaption filter comprises a multiple-tap finite impulse response filter, or coefficients of at least one of the adaption filter or the delay unit are configured based on a characterization of the complex filter.

5. The receiver of claim 1, comprising:

a training unit configured to perform a training process to generate at least one of the first correction factor for the first correction or the second correction factor for the second correction.

6. The receiver of claim 5, comprising:

a pre-processing unit configured to generate a normalized corrected receive signal and provide the normalized corrected receive signal to the training unit for use in generating the first correction factor.

7. The receiver of claim 5, wherein the training unit comprises:

an imbalance path for generating the first correction factor; and a nonlinear direct current term path for generating the second correction factor.

8. The receiver of claim 7, wherein:

the imbalance path comprises:

a first register configured to store the first correction factor;

a square unit configured to generate a squared signal;

a first multiplier configured to multiply the squared signal by a first learning rate to generate a first training factor; and a first adder configured to subtract the first training factor from the first correction factor to generate an updated first correction factor for use in generating a second corrected receive signal from a second digital receive signal after the corrected receive signal is generated; and the nonlinear direct current term path comprises:

a second register configured to store the second correction factor;

a second multiplier configured to use a second learning rate to generate a second training factor; and a second adder configured to subtract the second training factor from the second correction factor to generate an updated second correction factor for use in generating the second corrected receive signal from the second digital receive signal after the corrected receive signal is generated.

9. The receiver of claim 8, wherein:

the training unit comprises a sequencer configured to generate the first learning rate and the second learning rate for a first training sequence;

the imbalance path comprises:

a first filter configured to filter the first correction factor to generate a filtered first correction factor; and a first switch configured to store one of the filtered first correction factor or the updated first correction factor in the first register;

the nonlinear direct current term path comprises:

a second filter configured to filter the second correction factor to generate a filtered second correction factor; and a second switch configured to store one of the filtered second correction factor or the updated second correction factor in the second register; and the sequencer is configured to:

change the first learning rate and the second learning rate for a second training sequence;

control the first switch to load the first register with the filtered first correction factor for the second training sequence; and control the second switch to load the second register with the filtered second correction factor for the second training sequence.

10. A receiver, comprising:

a mixer configured to receive a passband receive signal and generate a baseband receive signal based on a local oscillator frequency;

a complex filter configured to filter the baseband receive signal to generate a filtered baseband signal;

an analog-to-digital converter configured to convert the filtered baseband signal to a digital receive signal;

a correction unit configured to receive the digital receive signal and generate a corrected receive signal, wherein the correction unit comprises:

a first register configured to store a first correction factor used to generate a first correction for reducing nonlinear direct current terms in the digital receive signal;

a conjugate unit configured to generate a conjugate signal based on a conjugate of the digital receive signal;

a delay unit configured to delay the conjugate signal to generate a delayed conjugate signal;

an adaption filter configured to filter the delayed conjugate signal to generate a filtered adaption signal;

a second register configured to store a second correction factor;

a multiplier connected to the second register and configured to apply the second correction factor to the filtered adaption signal to generate a second correction for reducing imbalance in the digital receive signal; and an adder configured to add the first correction and the second correction to the digital receive signal to generate the corrected receive signal; and a training unit configured to perform a training process to generate at least one of the first correction factor or the second correction factor.

11. The receiver of claim 10, wherein:

the delay unit is configured based on a characterization of the complex filter; and the adaption filter is configured based on the characterization of the complex filter.

12. The receiver of claim 10, wherein:

the adaption filter comprises a multiple-tap finite impulse response filter.

13. The receiver of claim 10, comprising:

a pre-processing unit configured to generate a normalized corrected receive signal and provide the normalized corrected receive signal to the training unit for use in generating the first correction factor.

14. The receiver of claim 10, wherein the training unit comprises:

an imbalance path for generating the first correction factor; and a nonlinear direct current term path for generating the second correction factor.

15. The receiver of claim 14, wherein:

the imbalance path comprises:

a square unit configured to generate a squared signal;

a first multiplier configured to multiply the squared signal by a first learning rate to generate a first training factor; and a first adder configured to subtract the first training factor from the first correction factor to generate an updated first correction factor for use in generating a second corrected receive signal from a second digital receive signal after the corrected receive signal is generated; and the nonlinear direct current term path comprises:

a second multiplier configured to use a second learning rate to generate a second training factor; and a second adder configured to subtract the second training factor from the second correction factor to generate an updated second correction factor for use in generating the second corrected receive signal from the second digital receive signal after the corrected receive signal is generated.

16. The receiver of claim 15, wherein:

the training unit comprises a sequencer configured to generate the first learning rate and the second learning rate for a first training sequence;

the imbalance path comprises:

a first filter configured to filter the first correction factor to generate a filtered first correction factor; and a first switch configured to store one of the filtered first correction factor or the updated first correction factor in the first register;

the nonlinear direct current term path comprises:

a second filter configured to filter the second correction factor to generate a filtered second correction factor; and a second switch configured to store one of the filtered second correction factor or the updated second correction factor in the second register; and the sequencer is configured to:

change the first learning rate and the second learning rate for a second training sequence;

control the first switch to load the first register with the filtered first correction factor for the second training sequence; and control the second switch to load the second register with the filtered second correction factor for the second training sequence.

17. A method, comprising:

mixing a passband receive signal with a local oscillator frequency to generate a receive signal;

filtering the receive signal using a complex filter to generate a filtered receive signal;

converting the filtered receive signal to a digital receive signal;

generating a conjugate signal based on the digital receive signal;

delaying the conjugate signal to generate a delayed conjugate signal;

multiplying the delayed conjugate signal by a first correction factor to generate a first correction;

generating a second correction based on a second correction factor; and adding the first correction and the second correction to the digital receive signal to generate a corrected receive signal, wherein the first correction reduces imbalance in the digital receive signal and the second correction reduces nonlinear direct current terms in the digital receive signal.

18. The method of claim 17, wherein generating the second correction comprises:

filtering the delayed conjugate signal to generate a filtered adaption signal; and multiplying the second correction factor by the filtered adaption signal to generate the second correction.

19. The method of claim 17, comprising:

performing a training process to generate the first correction factor for the first correction.

20. The method of claim 19, comprising:

performing the training process to generate the second correction factor for the second correction.

* * * * *